United States Patent
Makishima

(10) Patent No.: US 6,970,277 B1
(45) Date of Patent: Nov. 29, 2005

(54) SHOCK DETECTING APPARATUS AND IMAGE FORMING APPARATUS COMPRISES SHOCK DETECTING APPARATUS

(75) Inventor: Shinji Makishima, Sumida-ku (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/003,333

(22) Filed: Dec. 6, 2004

(51) Int. Cl.$^7$ .......................... G02B 26/00; G11B 7/00; G01L 1/16
(52) U.S. Cl. ................ 359/238; 369/53.18; 369/44.32; 73/862.68; 396/53; 396/542
(58) Field of Search ..................... 359/238; 369/53.18, 369/44.32, 53, 542; 73/862.68

(56) References Cited

FOREIGN PATENT DOCUMENTS

| JP | 7-130115 A | 5/1995 |
|---|---|---|
| JP | 2000-88680 A | 3/2000 |
| JP | 2000-242514 A | 9/2000 |

*Primary Examiner*—Timothy Thompson
(74) *Attorney, Agent, or Firm*—Foley & Lardner LLP

(57) ABSTRACT

A shock detecting apparatus has a sensor which detects a shock received by an apparatus that is provided with the shock detecting apparatus, a first memory which stores a first threshold value for detecting reception of a shock that cannot guarantee the function quality of the apparatus, but can enable operation of the apparatus, a second memory which stores a second threshold value larger than the first threshold value for detecting reception of a shock that disables operation of the apparatus, a third memory which stores information concerning a shock, a control unit which compares the magnitude of a shock with the first and second threshold values when the sensor detects the shock, and controls to store the information in the third memory according to the comparison result, and a battery which supplies power to the sensor and control unit even if power is not supplied from the apparatus.

14 Claims, 7 Drawing Sheets

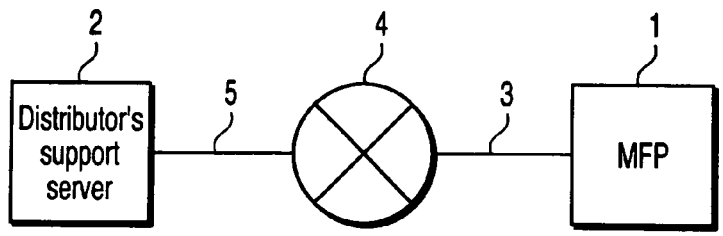
FIG. 1
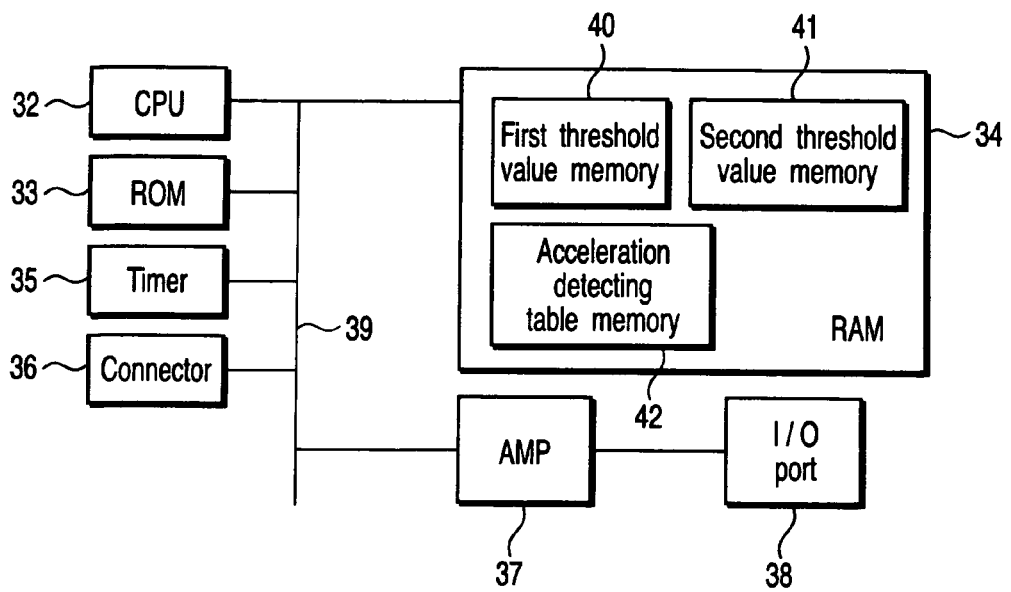
FIG. 3
| Date of detection | Level | Length (X-axis) direction | | Width (Y-axis) direction | | Height (Z-axis) direction | |
|---|---|---|---|---|---|---|---|
| | | Acceleration value | Waveform data | Acceleration value | Waveform data | Acceleration value | Waveform data |
| | | | | | | | |
| | | | | | | | |
FIG. 4

SHOCK DETECTING APPARATUS AND IMAGE FORMING APPARATUS COMPRISES SHOCK DETECTING APPARATUS

BACKGROUND OF THE INVENTION

1. Field of the Invention

The present invention relates to a shock detecting apparatus which detects that a shock has been received, and an image forming apparatus having the shock detecting apparatus.

2. Description of the Related Art

An image forming apparatus may receive a shock during shipment or transportation. An image forming apparatus may become defective if a shock is received. If a defective apparatus is operated as it is, a trouble may occur.

As prior art, there is a known method of recording a shock by providing a shock detecting sensor and notifying reception of a shock to the user when actuating an apparatus. For example, Jpn. Pat. Appln. KOKAI Publication No. 2000-88680 describes an electronic equipment system having a shock sensor, which is operated from a backup power supply even if a main power supply is turned off, and shuts off the power from the main power supply by notifying the user that a shock has been received.

However, depending on the magnitude of shock, the apparatus may become defective or may be operated. Namely, when the apparatus receives a shock, it is not necessarily to shut off the power supply and stop operation of the apparatus.

Therefore, there is the need for a shock detecting apparatus which effectively deals with a shock, and an image forming apparatus having such a shock detecting apparatus.

BRIEF SUMMARY OF THE INVENTION

According to an aspect of the present invention, there is provided a shock detecting apparatus comprising a sensor which detects a shock received by an apparatus that is provided with the shock detecting apparatus; a first memory which stores a first threshold value for detecting reception of a shock that cannot guarantee the function quality of the apparatus, but can enable operation of the apparatus; a second memory which stores a second threshold value larger than the first threshold value for detecting reception of a shock that disables operation of the apparatus; a third memory which stores shock detection information concerning a shock; a control unit which compares the magnitude of a shock with the first and second threshold values when the sensor detects the shock, and controls to store the shock detection information concerning the shock in the third memory according to the comparison result; and a battery which supplies power to the sensor and control unit even if power is not supplied from the power supply unit of the apparatus.

Objects and advantages of the invention will become apparent from the description which follows, or may be learned by practice of the invention.

BRIEF DESCRIPTION OF THE SEVERAL VIEWS OF THE DRAWING

The accompanying drawings illustrate embodiments of the invention, and together with the general description given above and the detailed description given below, serve to explain the principles of the invention.

FIG. 1 is a view showing the network configuration in a first embodiment of the present invention;

FIG. 3 is a block diagram showing the essential parts of the internal structure of a recorder in the same embodiment;

FIG. 4 is an acceleration detecting table in the same embodiment;

DETAILED DESCRIPTION OF THE INVENTION

Hereinafter embodiments of the present invention will be explained with reference to the accompanying drawings.

First Embodiment

FIG. 1 is a view showing the network configuration connected with a multifunction peripheral (MFP) 1 that is an image forming apparatus. The MFP 1 is a composite machine having a copying function. The MFP 1 is connected to a distributor's support server 2 through a local area network (LAN) 3, Internet 4 and LAN 5. The distributor's support server 2 is managed by the distributor of MFP 1. The distributor's support server 2 supplies support information to the user of MFP 1 according to the request from the user.

Figure 2:
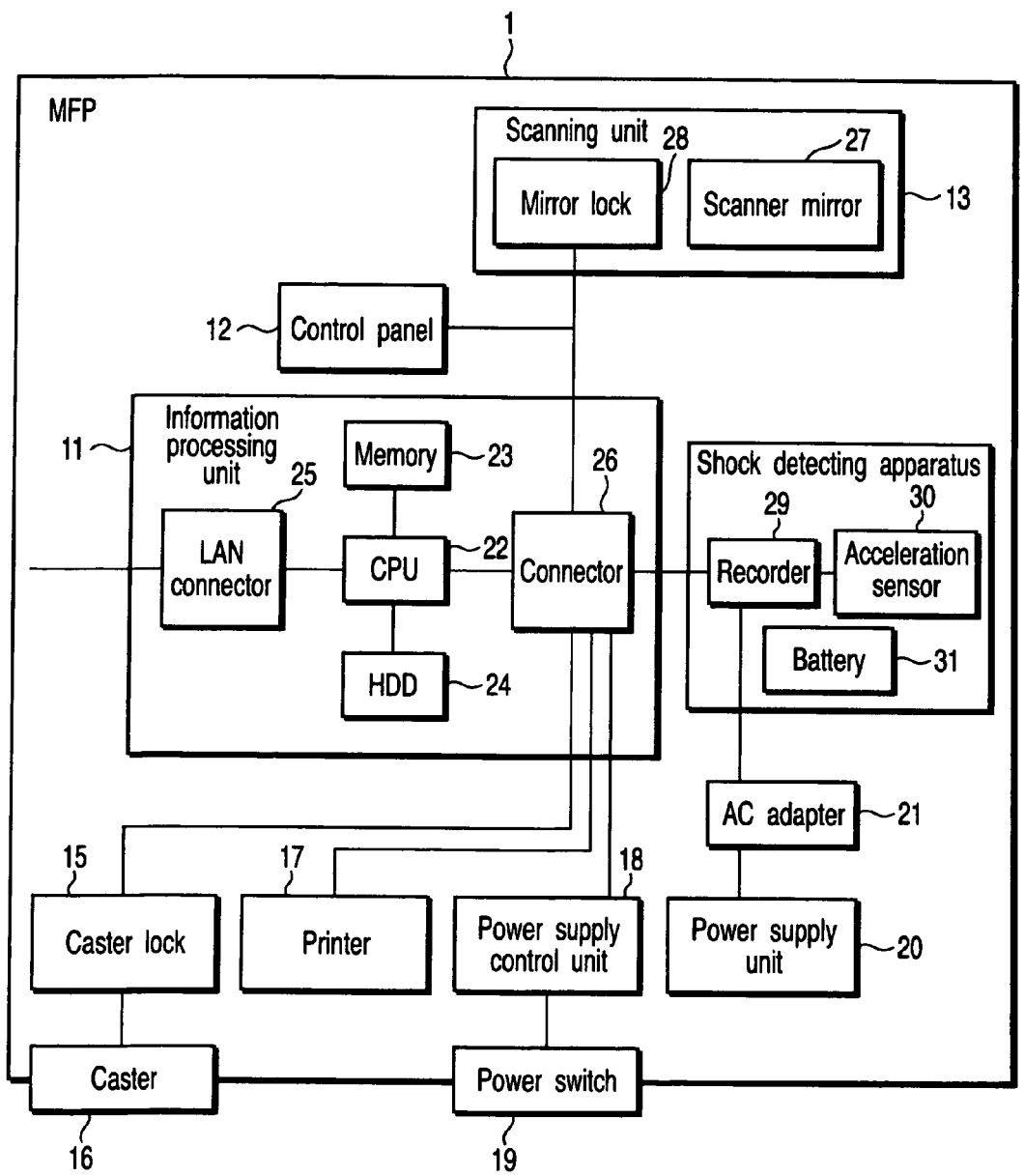
FIG. 2 is a block diagram showing the essential parts of the internal structure of an MFP in the same embodiment.

FIG. 2 is a block diagram showing the essential parts of the internal configuration of MFP 1 having a shock detecting apparatus 14. The MFP 1 comprises an information processing unit 11, a control panel 12, a scanning unit 13, a shock detecting apparatus 14, a caster lock 15, a caster 16, a printer 17, a power supply control unit 18, a power switch 19, a power supply unit 20, and an AC adapter 21.

The information processing unit 11 comprises a CPU 22, a memory 23, a hard disk drive (HDD) 24, a LAN connector 25, and a connector 26. The CPU 22 generally controls each part of the MFP 1 based on a control program stored in the memory 23. The memory 23 stores the control program and various data executed by the CPU 22. The HDD 24 stores large-capacity data such as image data. The LAN connector 25 is a connector for connecting a LAN cable of the LAN 3. The connector 26 is a connector for connecting the information processing unit 11 to the control panel 12, scanning unit 13, shock detecting apparatus 14, caster lock 15, printer 17, and power supply control unit 18.

Figure 6:
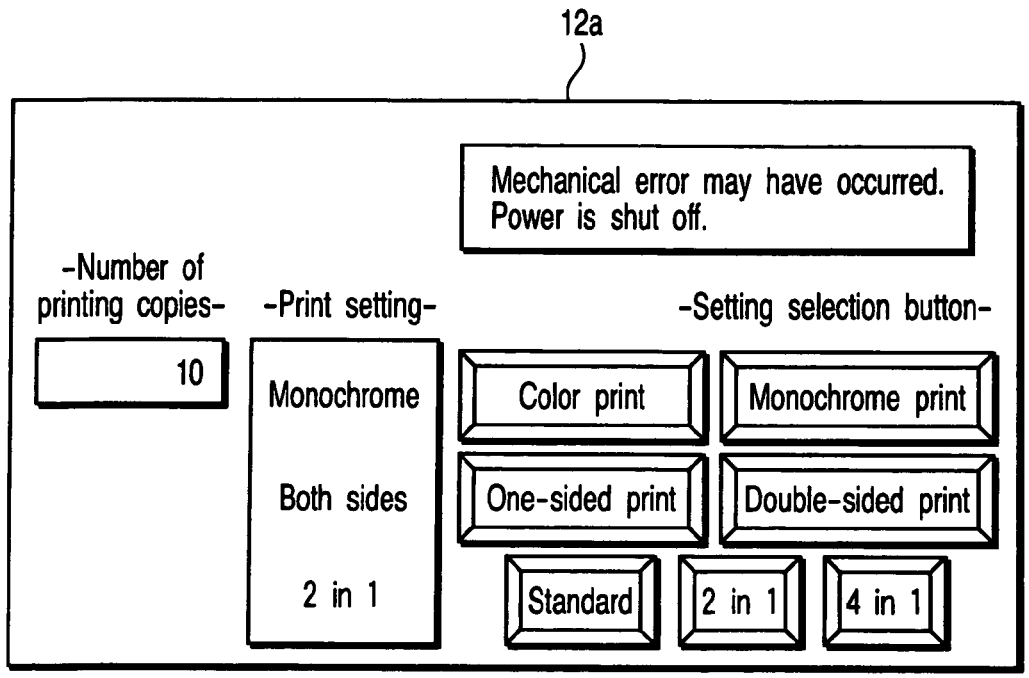
FIG. 6 is a view showing an example of display of a control panel in the same embodiment.

The control panel 12 has a touch panel 12a (shown in FIGS. 6 and 7) and various keys. The control panel 12 displays given information on the touch panel 12a to inform the user, and accepts the user's instructions through the touch panel 12a and keys.

The scanning unit 13 reads the images of the documents placed at a given position or documents sent continuously from a not-shown auto document feeder (ADF), and generates color image data. The scanning unit 13 has a scanner mirror 27 used for reading the images from documents, and a mirror lock 28 to lock the scanner mirror 27.

The shock detecting apparatus 14 comprises a recorder 29, an acceleration sensor 30, and a battery 31. The shock detecting apparatus 14 is provided inside the MFP 1 in the fixed state. FIG. 3 shows the essential parts of the internal configuration of the recorder 29. As shown in the drawing, the recorder 29 comprises a CPU 32, a ROM 33, a RAM 34, a timer 35, a connector 36, an AMP 37, and an I/O port 38. The CPU 32, ROM 33, RAM 34, timer 35, connector 36 and AMP 37 are connected through a bus line 39. The CPU 32 executes various controls based on the control program stored in the ROM 33. The ROM 33 stores the control program executed by the CPU 32. The RAM 34 has storage areas such as a first threshold value memory 40 to store a first threshold value, a second threshold value memory 41 to store a second threshold value, and an acceleration detecting table memory 42 to store an acceleration detecting table T. The timer 35 generates time information concerning dates and time. The connector 36 is used for electrically connecting the connector 26 of the information processing unit 11 through a communication cable. The I/O port 38 is used for connecting the acceleration sensor 30. The AMP 37 amplifies the signal sent from the acceleration sensor 30. The acceleration value or the like indicating the magnitude corresponding to the amplified signal is recorded in the acceleration detecting table T based on the control by the CPU 32. The acceleration sensor 30 detects the acceleration relating to three axes of length (X-axis), width (Y-axis) and height (Z-axis). The shock detecting apparatus 14 detects the magnitude of the shock received by the MFP 1 provided in the fixed state by detecting the acceleration that is detected by the acceleration sensor 30. The battery 31 supplies power to each part of the shock detecting apparatus 14 when the power switch 19 of MFP 1 is off (i.e., when power is not supplied from the power supply unit 20 of MFP 1). When the power switch 19 of MFP 1 is on, the shock detecting apparatus 14 is supplied with power from the power supply unit 20 in MFP 1 through the AC adapter 21.

Threshold values are set as follows for the first threshold value stored in the first threshold value memory 40 and the second threshold value stored in the second threshold value memory 41. Set as the first threshold value is an acceleration value for detecting reception of a shock that cannot guarantee the function quality of MFP 1, but enables operation of MFP 1. Set as the second threshold value is an acceleration value for detecting reception of a shock that disables operation of MFP 1.

The acceleration detecting table T stored in the acceleration detecting table memory 42 shown in FIG. 4 is a table for recording the shock detection information concerning the shock detected by the acceleration sensor 30. In the first embodiment, when a shock received in any one of the length, width and height directions is larger than the acceleration value set as the first threshold value, the detected shock data is recorded in the acceleration detecting table T. When the acceleration sensor 30 detects an acceleration value larger than the first threshold value in any one of the length, width and height directions, the CPU 32 records the magnitude level of the shock, the acceleration value in the length, width and height directions, and the waveform data of the acceleration value with respect to the time axis for the preset sampling time. As the shock magnitude level, level 1 is recorded if the acceleration value in any one of the length, width and height directions is over the first threshold value and under the second threshold value, when the MFP 1 receives a shock. Level 2 is recorded if the acceleration value in any one of the length, width and height directions is over the second threshold value, when the MFP 1 receives a shock. Further, when recording the shock detection information in the shock detecting table, the CPU 32 obtains the time information from the timer 35 and records by relating to the shock detection information.

The caster lock 15 is a device to lock operation of the caster 16 that allows the MFP 1 to be moved.

The printer 17 has a printer controller and engine, and forms color images based on the color image data generated by the scanning unit 13. The printer 17 is the same as the conventional one, and detailed a explanation will be omitted.

The power switch 19 is used to instruct to turn on the power of MFP 1. When the power supply control unit 18 detects that the power switch 19 is turned on, the unit supplies power from the power supply unit 20 to the shock detecting apparatus 14 through the AC adapter 21, and supplies power from the power supply unit 20 to each unit in the MFP 1.

Figure 5:
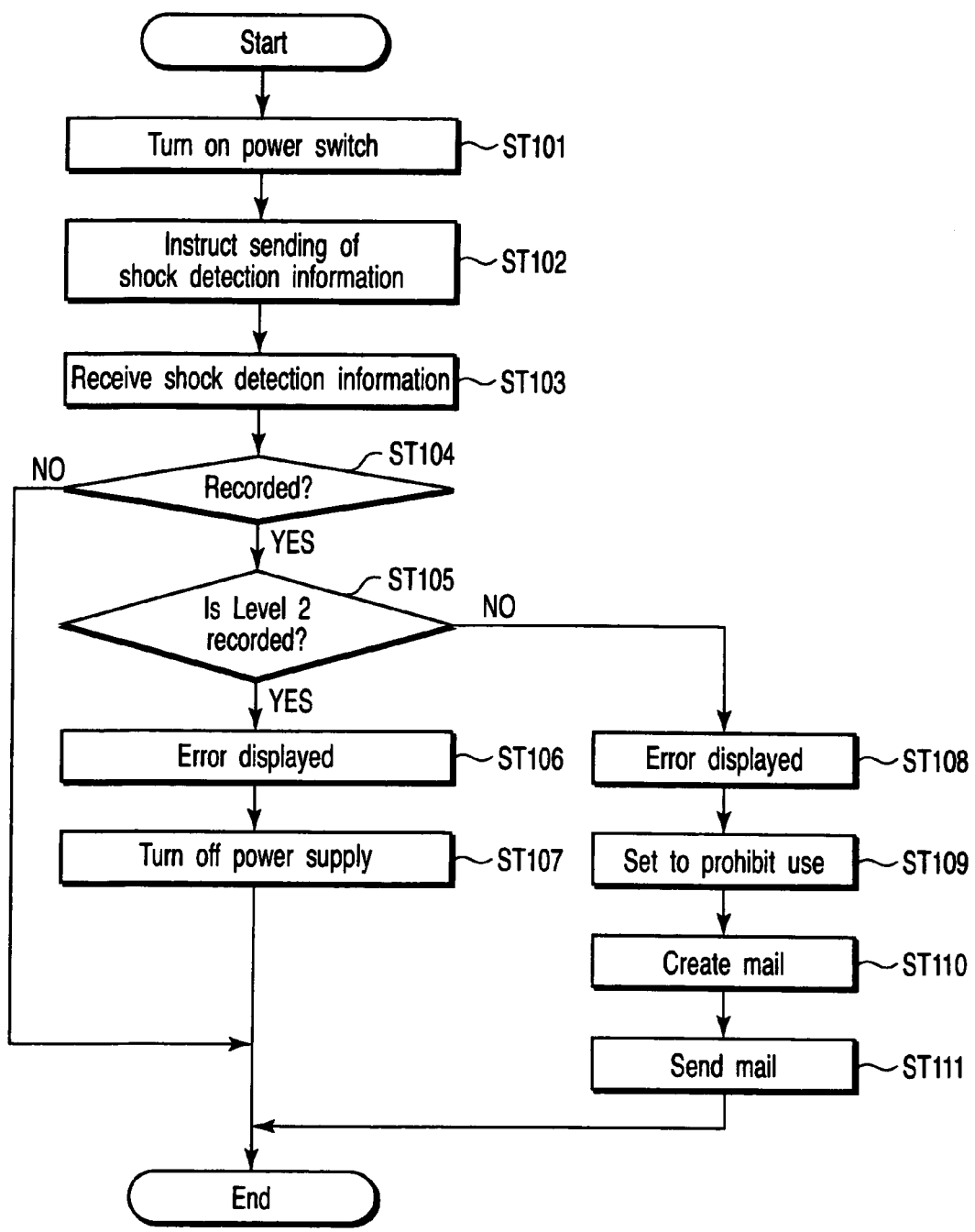
FIG. 5 is a flowchart showing processes executed by a CPU in the same embodiment.

FIG. 5 is a flowchart showing the essential processes executed by the CPU 22 of the MFP 1 configured as described above, when the power switch 19 is turned on. The other processes executed by the CPU 22 when the power switch 19 is turned on are the same as the conventional ones, and an explanation will be omitted.

When the power supply control unit 18 detects that the power switch 19 is turned on, power is supplied to each unit in the MFP 1. Then, the CPU 22 starts operation, and detects that the power switch 19 is turned on (ST 101). The CPU 22 sends an instruction to the CPU 32 in the recorder 29 to send the shock detection information recorded in the acceleration detecting table T (ST 102). The CPU 22 receives the shock detection information from the recorder 29 (ST 103). The CPU 22 determines whether the received shock detection information includes a record indicating that a shock has been detected (ST 104). In this embodiment, all information recorded in the acceleration detecting table T is sent, but the CPU 22 may instruct the CPU 32 of the recorder 29 to send only the information concerning the magnitude level of the recorded shock.

When YES in step ST 104, the CPU 22 checks whether level 2 is recorded in the shock level records included in the shock detection information. In this time, if the information concerning more than one shock record is included in the shock detection information, the CPU 22 checks whether the shock records include at least one record with level 2 (ST 105).

When YES in step ST 105, the CPU 22 displays an error on the touch panel 12a of the control panel (ST 106). The error display notifies the user to shut off the power supply, for example. The CPU 22 sends an instruction to the power supply control unit 18 to shut off the power supplied from the power supply unit 20 (ST 107).

On the other hand, if NO in step ST 105, the CPU 22 displays an error on the touch panel 12a of the control panel 12 (ST 108). The error display notifies the user to stop using the function that cannot be guaranteed, for example. At the same time of the display, the CPU 22 makes setting to prohibit using that function (ST 109). The function prohibited at this time is a color printing function, for example. The color printing function uses two or more units to form an image, and is likely to be affected by a shock. Thus, this function is prohibited. The setting to prohibit using the color printing function is made by displaying a message on the touch panel 12a of the control panel 12, indicating that color printing is impossible, or by setting not to display on the touch panel 12 to make it impossible to select color printing. The CPU 22 creates a mail that includes the following contents (ST 110). The mail contents include the information for specifying the MFP 1, the information that a function not guaranteed in the quality may occur as a result of a shock and that function is disabled, and the shock detection information that is the record contents of the acceleration detecting table T. After creating such a mail, the CPU 22 sends the mail to the distributor's support server 2 through the LAN connector 25, LAN 3, Internet 4 and LAN 5 (ST 111).

The processing is terminated in any one of the cases when NO in ST 104, the instruction to shut off the power is sent to the power supply control unit 18 in step ST 107, and a mail is sent to the distributor's support server 2 in step ST 111.

Next, explanation will be given on the operation of MFP 1 when the MFP 1 is shipped to from the distributor to the user and connected to an external power supply, the LAN cable is connected, the power switch 19 is turned on, and power is supplied from the power supply unit 20.

The MFP 1 provided with the shock detecting apparatus 14 in the fixed state is delivered from the distributor to the user by transporting by vehicle. Even while the power supplied from the power supply unit 20 of MFP 1 is off, as during delivery, the shock detecting apparatus 14 is powered from the battery 31 and operated. Therefore, if the MFP 1 receives any shock during transportation, the shock detecting apparatus 13 detects the shock. When the acceleration value of the shock in any one of the length, width and height directions is larger than the first threshold value, the CPU 22 of the shock detecting apparatus 14 detects the magnitude level of the shock, the acceleration value of the shock in the length, width and height directions and the waveform data of the acceleration value for a given time, and relates them to the time information, and records them in the acceleration detecting table T.

As described above, the MFP 1 which detects a shock by the shock detecting apparatus 14 during transportation is installed at the site of user, and then the power switch 19 is turned on and the MFP 1 is powered. When the power switch is turned on, if the shock detecting apparatus 14 has not recorded any shock, the MFP 1 operates as usual and realizes the functions of MFP 1.

If the shock detecting apparatus 14 has detected a shock of level 2 even once when the power switch 19 is turned on, the touch panel 12a of the control panel 12 displays the message "Mechanical error may have occurred. Power is shut off." for example, shown in FIG. 6, and the power is automatically shut off.

Figure 7:
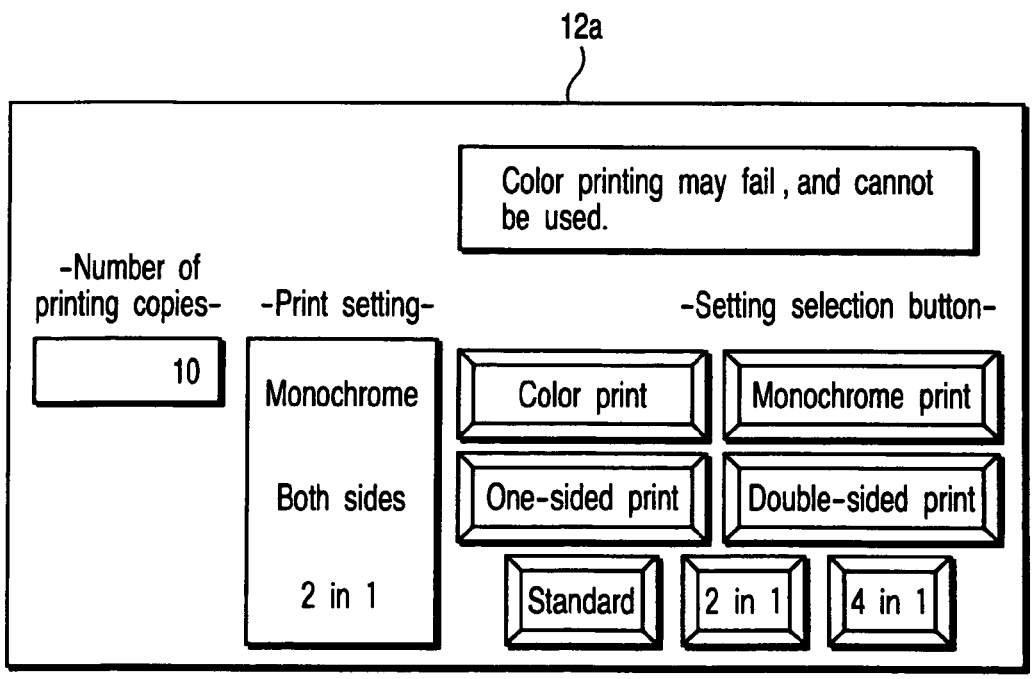
FIG. 7 is a view showing an another example of display of a control panel in the same embodiment.
Figure 8:
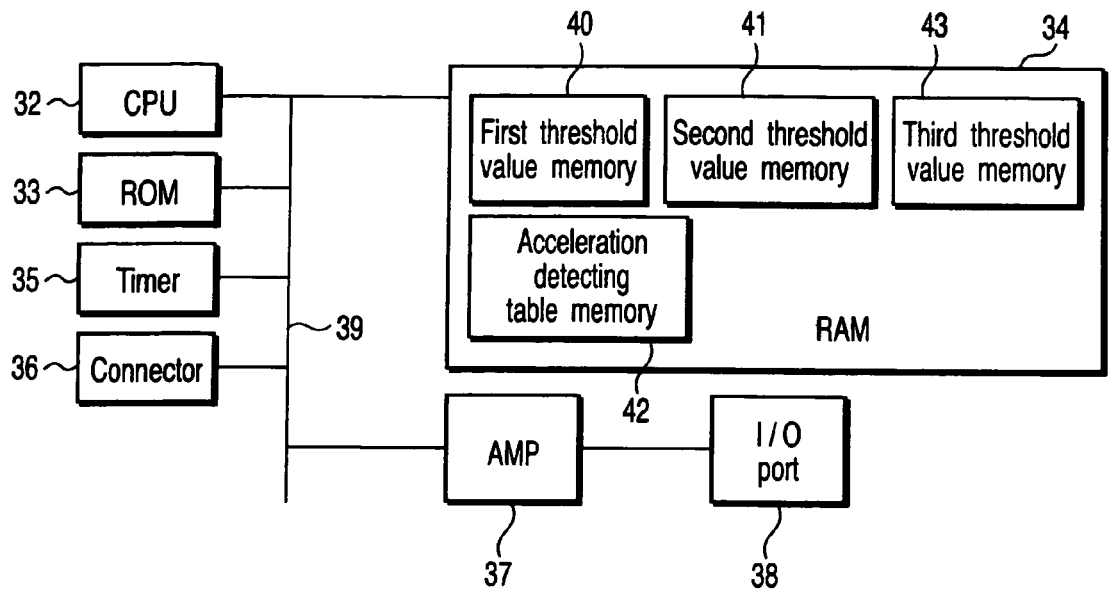
FIG. 8 is a block diagram showing the essential parts of the internal structure of a recorder in a second embodiment.

If the shock detecting apparatus 14 has detected only a shock of level 1 when the power switch 19 is turned on, the touch panel 12a displays the message "Color printing may fail, and cannot be used." For example, as shown in FIG. 7, and the CPU 22 sends to the distributor's support server 2 a mail indicating that use of the function not guaranteed in the quality is prohibited, the shock detection information concerning the shock detected by the shock detecting apparatus 14, and the information to specify the MFP 1.

The above described shock detecting apparatus 14 classifies the magnitude of the shocks received by the MFP 1 into level 1 and level 2, and records them in the acceleration detecting table T. As the magnitude of the received shocks is classified into level 1 and level 2, the MFP 1 can perform processing according to the level recorded in the acceleration detecting table T and can effectively handle a shock when the power switch is turned on.

In the above first embodiment, when the CPU 22 of MFP 1 determines that the acceleration detecting table T does not include a record of level 2 in step ST 105 (namely, NO in ST 105), the CPU 22 goes to step ST 108. However, it is permitted to perform the following processing. Namely, if NO in step ST 105, the CPU 22 checks whether a shock of level 1 has been recorded twice or more in the shock detection information. When the CPU 22 determines that a shock of level 1 has not been recorded twice or more, the CPU 22 goes to the processing of step ST 108. When a shock of level 1 has been recorded twice or more, the CPU 22 goes to the processing of the step ST 106. By processing in this way, when a shock of level 1 has been recorded twice or more in the shock detection information, it can be handled in the same way as that a shock of level 2 has been recorded.

The shock detecting apparatus 14 is configured to record the shock detection information in the acceleration detecting table T when the magnitude of the detected shock is larger than the first threshold value. It is also permitted to record a shock of the degree usually received during carrying and movement in the acceleration detecting table T. In this case, for example, level 0 is recorded in the acceleration detecting table T. When the shock detecting apparatus 14 is configured as above, the CPU 22 of MFP 1 is set to perform the following processing. After determining YES in step ST 104, the CPU 22 checks whether level 0 is recorded in the shock detection information. If level 0 is recorded, the CPU 22 goes to the processing of step ST 105. If level 0 is not recorded, the CPU terminates the processing. If NO in the check of step ST 104, the CPU 22 goes to the processing of step ST 106. By processing in this way, if no shock is recorded in the acceleration detecting table T, the power supply can be automatically shut off. Configured in this way, even if the shock detecting apparatus 14 fails, appropriate processing is possible.

Second Embodiment

Next, a second embodiment will be explained. In the second embodiment, the shock detecting apparatus 14 of the first embodiment is used as a seismometer. The same reference numerals are given to the same components as those of the above-mentioned embodiment, and a detailed explanation will be omitted.

The difference from the first embodiment is that the RAM 34 of the recorder 29 is further provided with a third threshold value memory 43 to store a third threshold value. The third threshold value is used to detect seismic intensity of an earthquake on a given scale. In this embodiment, the third threshold value (the acceleration value larger than the second threshold value) is set in the RAM 34 of the recorder 29 by the operator by operating the control panel 12 when installing the MFP 1. When a shock is detected, the CPU 32 of the recorder 29 records level 1 in the acceleration detecting table T if the shock is over the first threshold value and under the second threshold value, level 2 if the shock is over the second threshold value and under the third threshold value, and level 3 if the shock is over the third threshold value. At the same time, the CPU 32 records the acceleration of the shock in the length, width and height directions and the waveform data of the acceleration value for a given time by relating to the time information.

Next, explanation will be given on the processing executed by the CPU 22 of the MFP 1 having the shock detecting apparatus 14 configured to detect an earthquake as described above.

Figure 9:
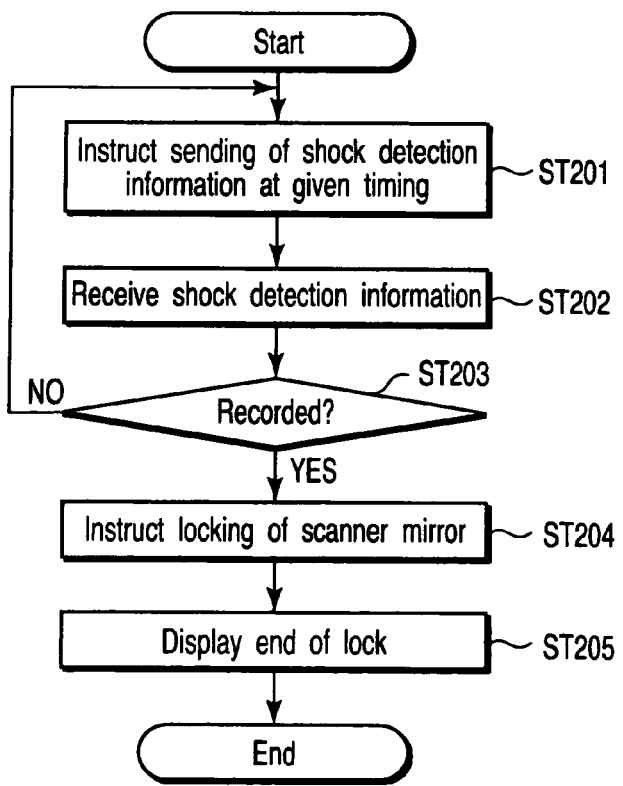
FIG. 9 is a flowchart showing processes executed by the CPU in the same embodiment.

FIG. 9 is a flowchart showing the essential processes that the CPU 22 of the MFP 1 locks the scanner mirror 27 of the scanning unit 13.

The CPU 22 sends an instruction to the CPU 32 in the recorder 29 to send the shock detection information recorded in the acceleration detecting table T at every given timing (e.g., a very short interval) (ST 201). The CPU 22 receives the shock detection information from the recorder 29 (ST 202). The CPU 22 checks whether the received shock detection information includes a record indicating that a shock has been detected (ST 203). By steps ST 201 to ST 203, the CPU 22 monitors the shock detection information recorded in the acceleration detecting table T in the recorder 29.

If the CPU 22 determines that the received shock detecting information does not include a record indicating that a shock has been detected, the CPU 22 re-execute the processing of step ST 201. If the record is included, the CPU 22 sends an instruction to lock the scanner mirror 27 to the mirror lock 28 of the scanning unit 13 (ST 204). Receiving the instruction, the mirror lock 28 locks the scanner mirror 27 to prevent its movement. After sending the instruction to the mirror lock 28, the CPU 22 displays the end of locking the scanner mirror 27 on the touch panel 12a of the control panel 12 (ST 205). Then, the processing is terminated.

Figure 10:
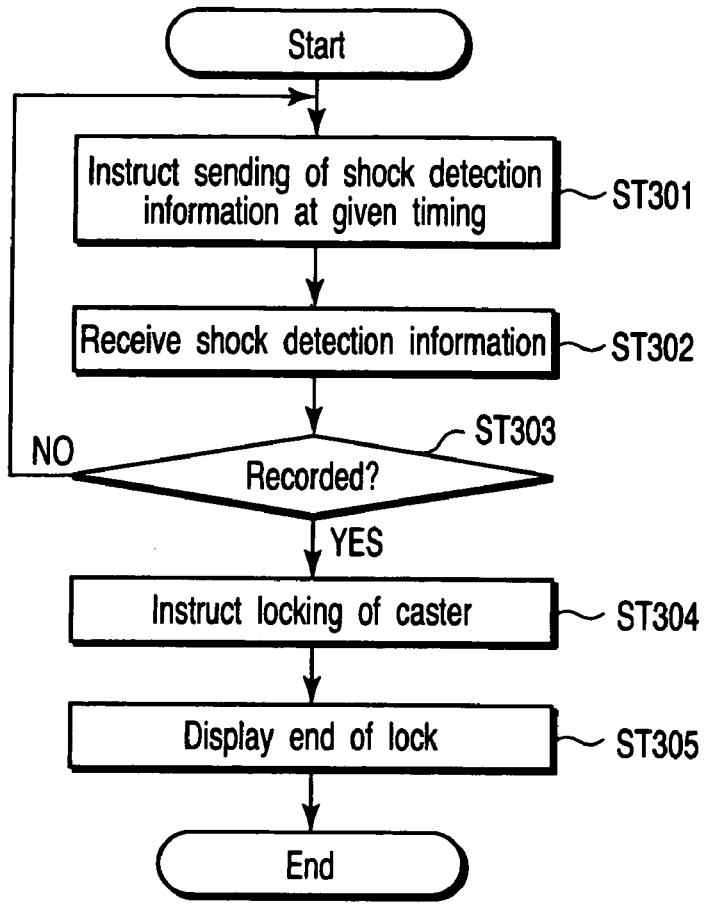
FIG. 10 is a flowchart showing other processes executed by CPU in the same embodiment.

FIG. 10 is a flowchart showing the essential processes by which the CPU 22 of the MFP 1 locks the caster 16.

The processing of steps ST 301 to ST 303 is the same as that of steps ST 201 to ST 203, and an explanation will be omitted.

When the CPU 22 determines that a record is included in step ST 303, the CPU 22 sends the caster lock 15 an instruction to lock the caster 16 (ST 304). Receiving the instruction, the caster lock 15 locks the caster 16 to its movement. After sending the instruction to the caster lock 15, the CPU 22 displays the end of locking the caster 16 on the touch panel 12a of the control panel 12 (ST 305). Then, the processing is terminated.

When an earthquake occurs, the shock detecting apparatus 14 configured as described above detects the shock. When the acceleration value of the shock in any one of the length, width and height directions is over the third threshold value, level 3, the acceleration values in the length, width and height directions and the waveform data of the acceleration value for a given time are recorded in the acceleration detecting table T by related them to the time information. When a shock of level 3 is recorded, the MFP 1 locks the scanner mirror 27 by the mirror lock 28, and locks the caster 16 by the caster lock 15, based on the shock detection information recorded in the acceleration detecting table T.

Therefore, when an earthquake occurs, the MFP 1 can lock the scanner mirror 27 that is weak to a shock to prevent its movement. This prevents a problem, for example, a malfunction that may occur when the scanner mirror 27 moves during an earthquake.

Further, the MFP 1 can lock the caster 16 so it does not move when an earthquake occurs. This prevents movement of the MFP 1 during an earthquake.

Third Embodiment

Figure 11:
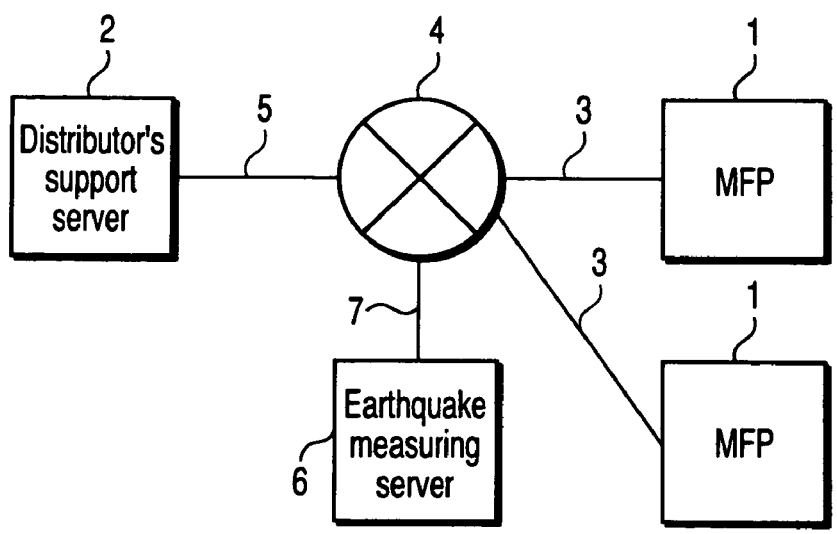
FIG. 11 is a view showing the network configuration in a third embodiment of the present invention.

Next, a third embodiment will be explained. The third embodiment is configured to send the information concerning the earthquake detected by the shock detecting apparatus 14 of the second embodiment to an earthquake observation server connected to Internet. FIG. 11 is a view showing the network configuration of the third embodiment. In addition to the configuration explained in FIG. 1, an earthquake observation server 6 is connected to the Internet 4 through a LAN 7, and two or more MFPs 1 are connected to the Internet 4. The earthquake observation server 6 is installed in facilities to observe an earthquake.

Figure 12:
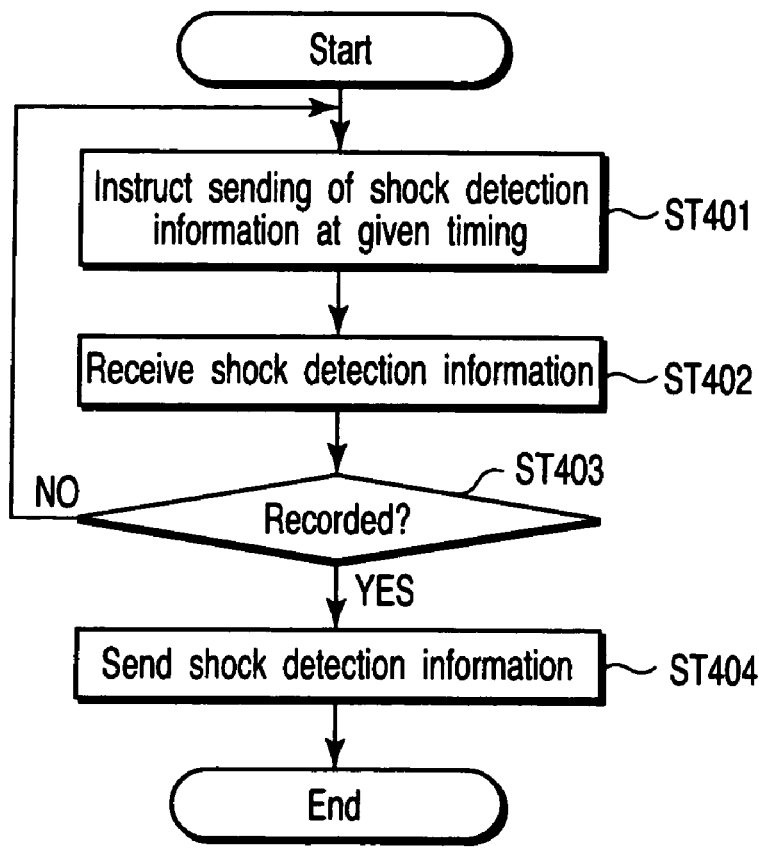
FIG. 12 is a flowchart showing processes executed by the CPU in the same embodiment.

FIG. 12 is a flowchart showing the essential processes executed by the CPU 22 of MFP 1 when sending the information concerning an earthquake to the earthquake observation server.

The processing of steps ST 401 to ST 403 is the same as that of steps ST 201 to ST 203, and an explanation will be omitted.

When a record is detected in step ST 403, the CPU 22 of MFP 1 sends the shock detection information received in step ST 402 to the earthquake observation server 6 through the LAN 3, Internet 4 and LAN 7.

When an earthquake occurs, the earthquake observation server 6 receives the shock detection information from the two or more MFPs 1 connected to the Internet 4. An earthquake can be observed in detail by using the received shock detection information.

Fourth Embodiment

A fourth embodiment is configured so that the MFP 1 cannot create an image when an earthquake occurs. The basic configuration of the MFP 1 of the fourth embodiment is similar to that of the MFP 1 of the first embodiment, and an explanation will be omitted. When an earthquake occurs, for example, the facilities having the earthquake observation server 6 explained in the third embodiment send a notice of occurrence of an earthquake through the Internet 4.

Figure 13:
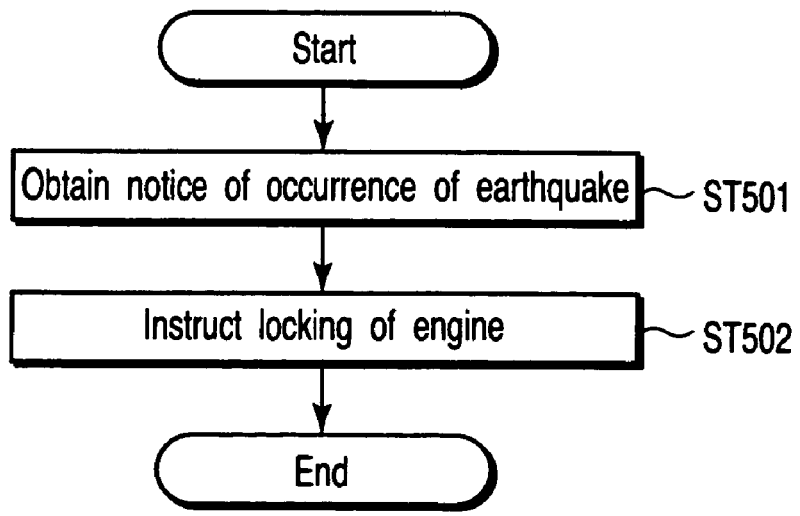
FIG. 13 is a flowchart showing processes executed by the CPU in a fourth embodiment.

FIG. 13 is a flowchart showing the essential processes that the CPU 22 of MFP 1 is disabled from creating an image when an earthquake occurs.

First, the CPU 22 obtains the information notifying occurrence of an earthquake (ST 501) through the Internet 4 and LAN 3. Then, the CPU 22 locks the engine of the printer 17 (ST 502).

After obtaining the information notifying occurrence of an earthquake, the MFP 1 configured as described above locks the engine in the printer 17. Thus, when an earthquake occurs, the MFP 1 cannot create an image. This prevents a problem caused by the earthquake.

The aforementioned embodiments have been explained in the case that a function that performs the invention has been previously recorded in the apparatus. However, a similar function may be downloaded to the apparatus from a network. It is also permitted to install a recording medium storing a similar function in the apparatus. As a recording medium, any format may be used as long as it can store a program and can be read by the apparatus, such as a CD-ROM. The function obtained by downloading or being previously installed may be one that realizes its function by cooperating with an operating system (OS) or the like in the apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A shock detecting apparatus comprising:
   a sensor which detects a shock received by an apparatus that is provided with the shock detecting apparatus;
   a first memory which stores a first threshold value for detecting reception of a shock that cannot guarantee the function quality of the apparatus, but can enable operation of the apparatus;

a second memory which stores a second threshold value larger than the first threshold value for detecting reception of a shock that disables operation of the apparatus;

a third memory which stores shock detection information concerning a shock;

a control unit which compares the magnitude of a shock with the first and second threshold values when the sensor detects the shock, and controls to store the shock detection information concerning the shock in the third memory according to the comparison result; and a battery which supplies power to the sensor and control unit even if power is not supplied from the power supply unit of the apparatus.

2. The shock detecting apparatus according to claim 1, wherein the control unit does not store shock detection information in the third memory when the magnitude of the detected shock is smaller than the first threshold value.

3. The shock detecting apparatus according to claim 2, wherein the shock detection information includes any one of a first information indicating that the magnitude of the detected shock is over the first threshold value and under the second threshold value, and a second information indicating that the magnitude of the detected shock is over the second threshold value.

4. The shock detecting apparatus according to claim 3, wherein the sensor detects acceleration relating to length, width and height directions, and the first and second threshold values store respective given acceleration values.

5. The shock detecting apparatus according to claim 4, wherein the shock detection information includes an acceleration value obtained when a shock is detected.

6. The shock detecting apparatus according to claim 5, wherein the shock detection information includes waveform data of the acceleration value of the shock detected by the sensor in the period that given time passes after the shock is detected.

7. The shock detecting apparatus according to claim 1, further comprising a timer which generates time information, wherein the control unit stores the shock detection information in the third memory by relating to the time information obtained when a shock is detected.

8. The shock detecting apparatus according to claim 1, further comprising a connector for electrically connecting the apparatus, wherein the control unit outputs the shock detection information stored in the third memory to the apparatus through the connector, according to the instruction sent from the apparatus through the connector.

9. The shock detecting apparatus according to claim 8, wherein the control unit receives the instruction sent from the apparatus, when the power switch of the apparatus is turned on.

10. An image forming apparatus comprising:

a power supply unit;

a shock detecting apparatus comprising a sensor which detects a shock; a first memory which stores a first threshold value for detecting reception of a shock that cannot guarantee the quality of the functions of the apparatus, but enables operation of the apparatus; a second memory which stores a second threshold value larger than the first threshold value for detecting reception of a shock that disables operation of the apparatus; a third memory which stores shock detection information concerning shocks; a control unit which compares the magnitude of a shock with the first and second threshold values when the sensor detects the shock, and controls to store the shock detection information concerning the shock in the third memory according to the comparison result; and a battery which supplies power to the sensor and control unit even if power is not supplied from the power supply unit;

a transmitting unit configured to send the control unit an instruction to send the shock detection information stored in the third memory, when power is supplied from the power supply unit; and a power supply shut-off unit configured to shut off the power supplied from the power supply unit, based on the shock detection information in response to the instruction.

11. The image forming apparatus according to claim 10, wherein the shock detecting apparatus further comprises a fourth memory to store a third threshold value for measuring an earthquake; and the control unit compares the magnitude of the shock with the third threshold value when the sensor detects a shock, and controls to store the shock detection information concerning the shock in the third memory according to the comparison result.

12. The image forming apparatus according to claim 11, further comprising a monitoring unit configured to monitor the shock detection information stored in the third memory when power is supplied from the power supply unit, a scanner having a scanner mirror, a mirror lock to lock the scanner mirror, and a mirror lock unit configured to lock the scanner mirror by the mirror lock based on the monitoring result of the monitoring unit.

13. The image forming apparatus according to claim 11, further comprising a monitoring unit configured to monitor the shock detection information stored in the third memory when power is supplied from the power supply unit, a caster, a caster lock to lock the caster, and a caster lock unit configured to lock the caster by the caster lock based on the monitoring result of the monitoring unit.

14. A program for operating an image forming apparatus having a power supply unit and a shock detecting apparatus comprising a sensor which detects a shock; a first memory which stores a first threshold value for detecting reception of a shock that cannot guarantee the quality of the functions of the apparatus, but enables operation of the apparatus; a second memory which stores a second threshold value larger than the first threshold value for detecting reception of a shock that disables operation of the apparatus; a third memory which stores shock detection information concerning shocks; a control unit which compares the magnitude of a shock with the first and second threshold values when the sensor detects the shock, and controls to store the shock detection information concerning the shock in the third memory according to the comparison result; and a battery which supplies power to the sensor and control unit even if power is not supplied from the power supply unit, comprising;

a function to detect that power is supplied from the power supply unit;

a function to send the control unit an instruction to send the shock detection information stored in the third memory, when the supply of power is detected; and a function to shut off the power supplied from the power supply unit, based on the shock detection information in response to the instruction.

* * * * *